US008730918B2

(12) United States Patent
Huang

(10) Patent No.: US 8,730,918 B2
(45) Date of Patent: May 20, 2014

(54) HANDOVER METHOD BASED ON MOBILE RELAY AND MOBILE WIRELESS RELAY SYSTEM

(75) Inventor: Yada Huang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 87 days.

(21) Appl. No.: 13/389,519

(22) PCT Filed: Aug. 18, 2010

(86) PCT No.: PCT/CN2010/076099
§ 371 (c)(1),
(2), (4) Date: Feb. 8, 2012

(87) PCT Pub. No.: WO2011/020432
PCT Pub. Date: Feb. 24, 2011

(65) Prior Publication Data
US 2012/0140700 A1 Jun. 7, 2012

(30) Foreign Application Priority Data
Aug. 18, 2009 (CN) .......................... 2009 1 0091331

(51) Int. Cl.
*H04W 4/00* (2009.01)
(52) U.S. Cl.
USPC ........................................ 370/331; 455/437
(58) Field of Classification Search
None
See application file for complete search history.

(56) References Cited

U.S. PATENT DOCUMENTS

| 2004/0082330 | A1* | 4/2004 | Marin ........................... 455/438 |
| 2007/0177547 | A1* | 8/2007 | Horn et al. ..................... 370/331 |
| 2007/0249347 | A1* | 10/2007 | Saifullah et al. .............. 455/436 |
| 2008/0019320 | A1* | 1/2008 | Phan et al. ..................... 370/331 |
| 2009/0129342 | A1* | 5/2009 | Hwang et al. .................. 370/331 |
| 2009/0141684 | A1* | 6/2009 | Hashimoto et al. ........... 370/331 |
| 2009/0253434 | A1* | 10/2009 | Hayashi et al. ............... 455/436 |
| 2010/0035616 | A1* | 2/2010 | Sebire ........................... 455/436 |
| 2010/0061339 | A1* | 3/2010 | Kim et al. ..................... 370/331 |
| 2010/0248726 | A1* | 9/2010 | Kagimoto et al. ............. 455/437 |

(Continued)

FOREIGN PATENT DOCUMENTS

CN 101262269 A 9/2008

OTHER PUBLICATIONS

Oumer Teyeb et al. 'Handover Framework for Relay Enhanced LTE Networks.' In: 2009 IEEE International Conference on Communications Workshops ICC 2009. Dresden,Germany: IEEE,Jun. 2009.

(Continued)

*Primary Examiner* — Anh-Vu Ly
*Assistant Examiner* — Gustavo Lopez-Vargas
(74) *Attorney, Agent, or Firm* — Ling Wu; Stephen Yang; Ling and Yang Intellectual Property

(57) ABSTRACT

The present invention provides a handover method based on a mobile relay comprising: when handover of the mobile relay occurs, a source Donor evolved NodeB (DeNB), as an intermediate node, connecting a relay access network with an Evolved Packet Core (EPC), the relay access network at least comprising a target DeNB and a mobile relay; and the source DeNB forwarding data from the relay access network to the EPC and forwarding the data from the EPC to the relay access network. With the present invention, the handover of the mobile relay is implemented, and the mobility of the relay can be supported.

11 Claims, 14 Drawing Sheets

(56) References Cited

U.S. PATENT DOCUMENTS

2010/0260109 A1* 10/2010 Ulupinar et al. ............. 370/328
2010/0311419 A1* 12/2010 Bi ............................. 455/435.1
2011/0158166 A1* 6/2011 Lee et al. ..................... 370/328
2011/0194407 A1* 8/2011 Ji et al. ........................ 370/226
2012/0002589 A1* 1/2012 Saifullah et al. ............. 370/315
2012/0051349 A1* 3/2012 Teyeb et al. .................. 370/338
2013/0058272 A1* 3/2013 Adjakple et al. ............. 370/315

OTHER PUBLICATIONS

International Search Report for PCT/CN2010/076099 dated Nov. 8, 2010.

* cited by examiner

HANDOVER METHOD BASED ON MOBILE RELAY AND MOBILE WIRELESS RELAY SYSTEM

TECHNICAL FIELD

The present invention relates to a relay technology in cellular wireless communication systems, and in particular, to a handover method based on a mobile relay and a mobile wireless relay system.

BACKGROUND OF THE RELATED ART

A cellular wireless communication system, as shown in FIG. 1, is mainly comprised of a User Equipment (UE), an access network and a Core Network (CN). A network comprised of eNodeBs, or eNodeBs and base station controllers is referred to as a Radio Access Network (RAN), which is responsible for transactions of an access layer, such as radio resource management. A physical or logical connection may exist between eNodeBs, and each eNodeB can be connected to one or more CN nodes. The CN is responsible for transactions of a non-access layer, such as location update, etc., and is an anchor point of a user plane.

In the cellular wireless communication system, wireless coverage of a fixed eNodeB network is limited due to various reasons, for example, coverage leaks exist inevitably in the wireless network coverage due to barrier of various building constructions to wireless signals. In addition, at edge regions of a cell, due to attenuation of wireless signal strength and interferences between adjacent cells, communication quality of the UE is poor and the error rate of the wireless transmission will increase when the US is at edges of the cell. In order to improve data transmission throughput, group mobility, temporary network deployment, throughput at edge regions of the cell and coverage of a new area, at present, a solution is to introduce a wireless network node, which is referred to as a relay, in the cellular wireless communication system.

The relay is a station which relays data between other network nodes through a wireless link, which is also referred to as a relay node/relay station, and its working principle is shown in FIG. 2. A UE which is directly served by the eNodeB is referred to as a macro UE, and a UE which is served by the relay is referred to as a relay UE. A wireless link between the eNodeB and the UE is referred to as a direct link, including an uplink/downlink (DL/UL) direct link; a link between the relay and the UE is referred to as an access link, including a DL/UL access link; and a wireless link between the eNodeB and the relay is referred to as a backhaul link, including a DL/UL backhaul link.

There are a number of methods for the relay to relay data, for example, directly amplifying a radio signal from the eNodeB; or processing data transmitted by the eNodeB accordingly to forward to the UE, wherein the processing may be demodulation or decoding; or the eNodeB and the relay cooperatively transmitting data to the UE, and conversely, the relay also relaying the data transmitted from the UE to the eNodeB.

Among many types of relay, there is one type of relay, which has the following characteristics.

A UE can not distinguish cells under a relay and a fixed eNodeB, i.e., from the perspective of the UE, there is no difference between the cell under the relay and the cell under the fixed eNodeB. Such a cell under the relay may be referred to as a relay cell. The relay cell, like all the other cells, has its own Physical Cell Identity (PCI), and transmits broadcast like ordinary cells. When the UE resides in the relay cell, the relay cell can individually allocate and schedule radio resources to the UE for use, and the resource scheduling of the relay and radio resource scheduling of the eNodeB (which is also referred to as a Donor eNodeB, i.e., the eNodeB to which the relay is connected by a backhaul link) participating in relay are independent of each other. The interface and protocol stack between the relay cell and the relay UE are the same as those between an ordinary eNodeB cell and an ordinary UE.

The current Long Term Evolution (LTE) cellular wireless communication system, as shown in FIG. 3, uses an Internet Protocol (IP) based flattened architecture, and is comprised of an Evolved Universal Terrestrial Radio Access Network (E-UTRAN), Evolved Packet Core (EPC) nodes and other support nodes. The EPC nodes include a Mobility Management Entity (MME), a Serving Gateway (S-GW) and a Packet Data Network Gateway (P-GW). The MME is responsible for control plane signaling, including control plane related operations, such as mobility management, non-access layer signaling processing, user mobility management, context management, etc. The S-GW is responsible for transmitting, forwarding, route handover of UE user plane data. The eNodeBs (eNBs) are logically connected via an X2 interface, and are used to support the mobility of the UE within the entire network to ensure seamless handover of the user. The P-GW is a node which connects the EPC with a packet data network (such as Internet), and is responsible for assigning an IP address of the UE, filtering IP data packets by service type into service data flows and binding the service data flows to a corresponding transmission bearer, and so on.

Each eNB is connected to a System Architecture Evolution (SAE) core network via a S1 interface, i.e., is connected to a MME via a control plane S1-MME interface, is connected to a S-GW via a user plane S1-U interface. The S1 interface supports multipoint connections between the eNB and the MME and S-GW. The MME and the S-GW are connected via a S11 interface, the S-GW and the P-GW are connected via a S5 interface, and the eNBs are connected via an X2 interface. Each eNB transmits signaling and data to the UE through an Uu interface. After the relay is introduced, the wireless interface between the relay and the eNB is the Un interface. The interface between the relay and the UE, like the interface between the eNB and the UE, is also an Uu interface.

Current relays are divided into three categories: fixed relays, nomadic relays, and mobile relays. Both the fixed relays and the nomadic relays are fixedly deployed, and the difference between them is that the nomadic relays can support plug and play, and are more convenient to deploy than the fixed relays. The mobile relays themselves have certain mobility, and in typical application scenes, the mobile relays are deployed on vehicles, such as trains, cars, etc., to facilitate provision of better services for the UE in the vehicles. As for mobile handover, the mobile relay, as a convergence network element, converges a large number of simultaneous movements of the UE into a movement of a network element, i.e., the mobile relay, thus reducing the overhead of signaling in the air interface and the network during handover.

However, based on the above deployment requirements of the mobile relay, the existing technology can not yet provide a mobile wireless relay system supporting the mobile relay and a handover method based on the mobile relay, thereby bringing inconvenience to practical applications.

CONTENT OF THE INVENTION

In view of this, a main object of the present invention is to provide a mobile wireless relay system and a handover method based on a mobile relay so as to implement handover of the mobile relay and support mobility of the relay.

In order to achieve the above object, the technical scheme of the present invention is implemented as follows:

The present invention provides a handover method based on a mobile relay, when handover of the mobile relay occurs, the method comprises:

a source Donor evolved NodeB (DeNB), as an intermediate node, connecting a relay access network with an Evolved Packet Core (EPC), the relay access network at least comprising a target DeNB and a mobile relay; and the source DeNB forwarding data from the relay access network to the EPC and forwarding the data from the EPC to the relay access network.

A forward channel between the source DeNB and the target DeNB encapsulates the data.

The forward channel is an Evolved Radio Access Bearer (E-RAB) back-haul transmission channel of the mobile relay.

The handover of the mobile relay specifically is that handover preparation is performed between the source DeNB and the target DeNB, and context information of the mobile relay at the source DeNB is exchanged;

after the handover preparation is completed, the target DeNB sets new Un configuration information of the mobile relay at a target cell, and transmits the Un configuration information to the mobile relay through the source DeNB; and the mobile relay performs Un reconfiguration based on the received Un configuration information, and reconfigures the Un interface from the source DeNB to the target DeNB.

The method further comprises:

after the mobile relay reconfigures the Un interface from the source DeNB to the target DeNB, negotiating configuration of a transmission channel between the target DeNB and the source DeNB and/or the EPC, performing channel switch, and establishing a data transmission channel between the mobile relay and the EPC.

The present invention further provides a handover method based on a mobile relay, wherein when handover of the mobile relay occurs, the method comprises:

an Evolved Packet Core (EPC) transforming data of a User Equipment (UE) which is served by the mobile relay from being forwarded through a source DeNB to being forwarded through a target DeNB based on control of the target DeNB.

The EPC at least includes a Mobility Management Entity (MME), which serves the UE, and a Serving Gateway (S-GW) or Packet Data Network Gateway (P-GW).

The data of the UE includes S1 control plane signaling and S1 user plane data of the UE.

The present invention further provides a mobile wireless relay system comprising a relay access network and an Evolved Packet Core (EPC), wherein the relay access network at least comprises a target Donor evolved NodeB (DeNB) and a mobile relay, a source DeNB, as an intermediate node, connects the relay access network with the EPC; and when handover of the mobile relay occurs, the source DeNB forwards data from the relay access network to the EPC and forwards the data from the EPC to the relay access network.

A forward channel between the source DeNB and the target DeNB encapsulates the data, and the forward channel is an Evolved Radio Access Bearer (E-RAB) back-haul transmission channel of the mobile relay.

The target DeNB is further configured to perform handover preparation with the source DeNB, and exchange context information of the mobile relay at the source DeNB; and after the handover preparation is completed, set new Un configuration information of the mobile relay at a target cell, and transmit the Un configuration information to the mobile relay through the source DeNB; and accordingly, the mobile relay is further configured to perform Un reconfiguration based on the received Un configuration information, and reconfigure the Un interface from the source DeNB to the target DeNB.

The target DeNB is further configured to, after the mobile relay reconfigures the Un interface from the source DeNB to the target DeNB, negotiate configuration of a transmission channel between the source DeNB and/or the EPC, perform channel switch, and establish a data transmission channel between the mobile relay and the EPC.

In the mobile wireless relay system and the handover method based on the mobile relay in accordance with the present invention, a DeNB is used as an intermediate node to connect a relay access network with an EPC, wherein the relay access network at least comprises a target DeNB and the mobile relay; and when handover of the mobile relay is performed, the EPC and the mobile relay forward data of their respectively served UEs to the target DeNB through a source DeNB based on instructions of the target DeNB. With the present invention, the handover of the mobile relay is implemented, and the mobility of the relay can be supported.

PREFERRED EMBODIMENTS OF THE PRESENT INVENTION

The technical scheme of the present invention will be further described in detail in combination with accompanying drawings and specific embodiments.

In order to implement handover of a mobile relay, the present invention provides a mobile wireless relay system comprising a mobile relay and eNBs connected to the mobile relay, which are also referred to as Donor eNBs (DeNBs). The DeNBs are divided into source DeNBs and target DeNBs. By source DeNB is meant an eNB which is connected before the handover of the mobile relay, and by target DeNB is meant an eNB which is connected after the handover of the mobile relay. The target DeNB and the mobile relay constitute a relay access network, which may also include a UE which is served by the mobile relay. In the system, the source DeNB as an intermediate node connects the relay access network with an EPC; and when handover of the mobile relay is performed, the source DeNB forwards data from the relay access network to the EPC, and forwards the data from the EPC to the relay access network.

Figure 1:
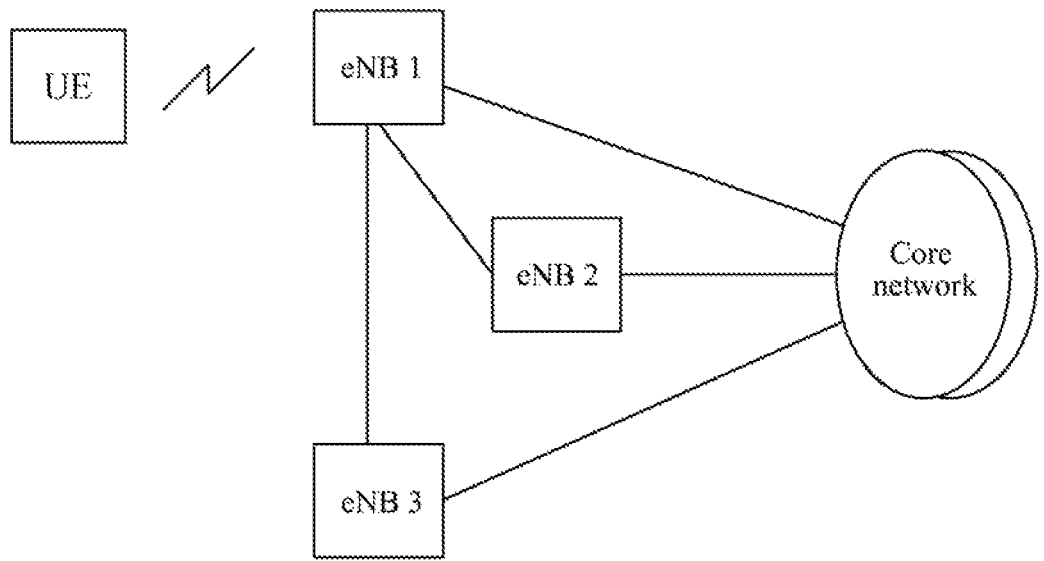
FIG. 1 is a structural diagram of a cellular wireless communication system in the existing technology.
Figure 2:
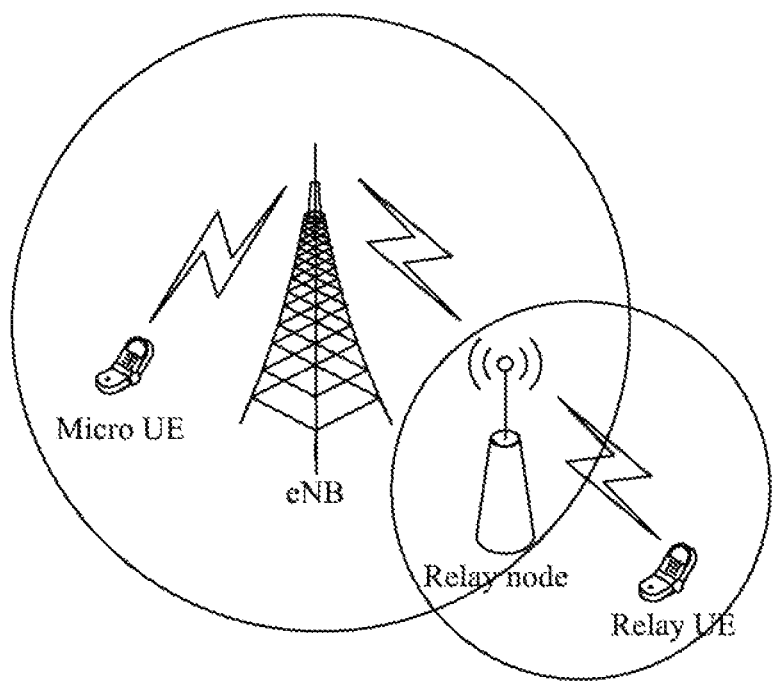
FIG. 2 is a schematic diagram of a network structure of a relay in the existing technology.
Figure 3:
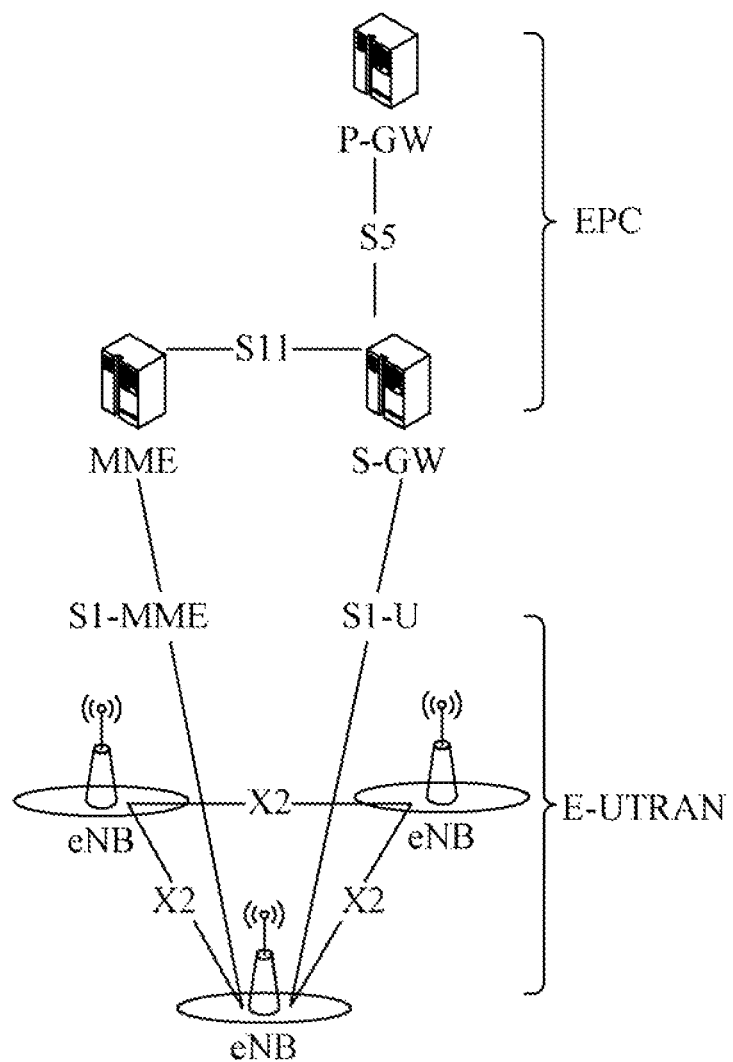
FIG. 3 is a schematic diagram of a network structure of a LTE cellular wireless communication system in the existing technology.
Figure 4:
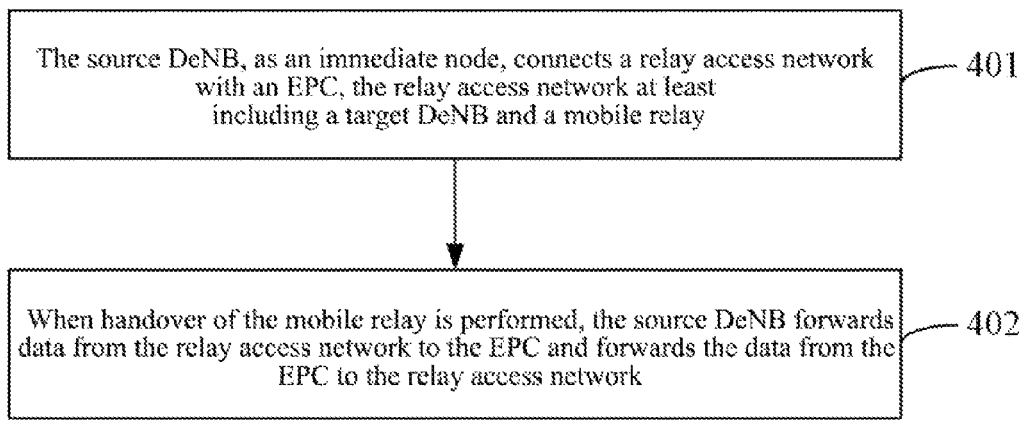
FIG. 4 is a flowchart of a handover method based on a mobile relay according to the present invention.

The handover method based on the mobile relay which is implemented by the mobile wireless relay system, as shown in FIG. 4, mainly comprises the following steps.

Step 401: the source DeNB, as an intermediate node, connects a relay access network with an EPC, wherein the relay access network at least comprises a target DeNB and the mobile relay.

Step 402: when handover of the mobile relay is performed, the source DeNB forwards data from the relay access network to the EPC and forwards the data from the EPC to the relay access network.

The source DeNB determines to inform the target DeNB when the mobile relay needs to perform handover according to a measurement report reported by the mobile relay or according to an internal algorithm decision. A data channel of the mobile relay is established between the source DeNB and the target DeNB by interaction between them, and the mobile relay is handed off to the target DeNB after the interaction.

Figure 5:
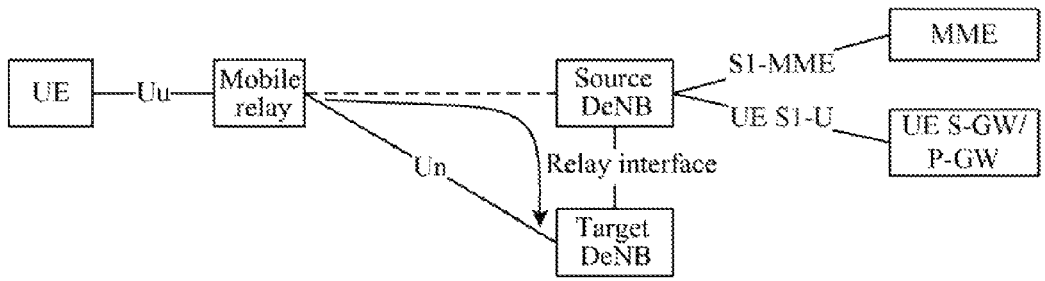
FIG. 5 is the first schematic diagram of handover of a mobile relay according to the present invention.

The network triggers the handover based on the internal algorithm, for example, the source DeNB determines the target DeNB to which the mobile relay is to be handed off based on measurements of the mobile relay. The source DeNB, as an intermediate node, connects a relay access network system with an EPC through an interaction process between the source DeNB and the target DeNB. As shown in FIG. 5, the relay access network at least includes the target DeNB and the mobile relay, and may also include a UE under the mobile relay. The data between the mobile relay and the EPC is transmitted between the source DeNB and the target DeNB.

Figure 6:
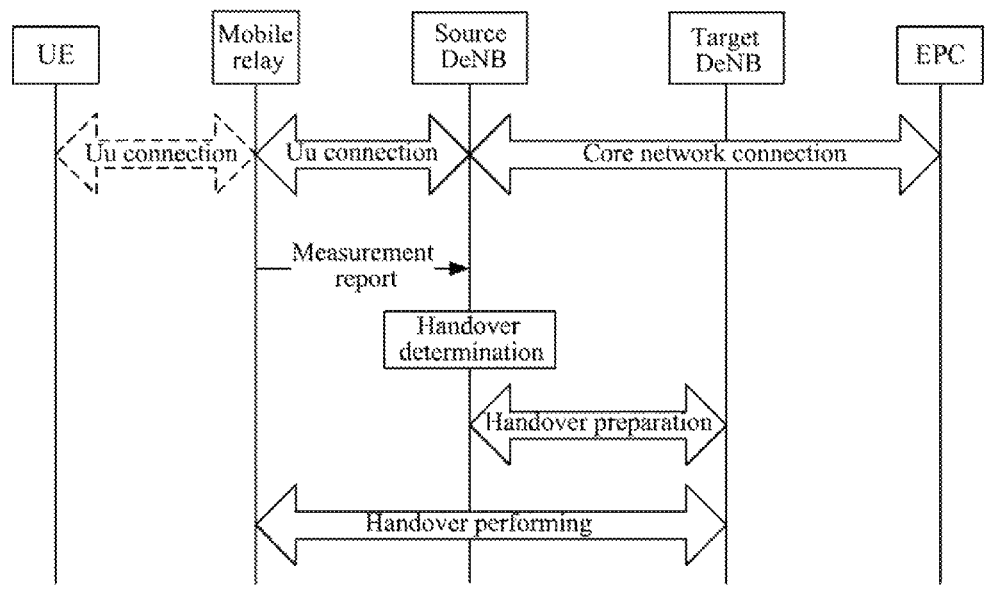
FIG. 6 is a flowchart of handover of a mobile relay according to the first embodiment of the present invention.

The first embodiment of the present invention, as shown in FIG. 6, is a flowchart of handover of a mobile relay. The mobile relay is in operation, a UE is firstly connected to the mobile relay through an Uu interface, and the mobile relay is connected to a source DeNB through the Un interface, and is connected to an EPC through the source DeNB. During movement of the mobile relay, a measurement report is reported to the source DeNB, and when the source DeNB discovers that signals of a resident cell under the source DeNB in which the mobile relay is located is worse than those of a cell under the target DeNB according to the measurement report, the source DeNB decides to initiate handover, and hands off the mobile relay to a cell where wireless environment is better. Firstly, handover preparation needs to be performed between the source DeNB and the target DeNB, and context information of the mobile relay at the source DeNB is required to be exchanged. The context information at least includes Un radio bearer information of the mobile relay and security related information of the mobile relay, and may also include partial context information of the UE under the mobile relay, such as various service configurations of the UE, etc. After the handover preparation is completed, the target DeNB sets new Un configuration information of the mobile relay at the target cell, and transmits the Un configuration information to the mobile relay through the source DeNB. After receiving the new Un configuration information, the mobile relay performs Un reconfiguration to reconfigure the Un interface from the source DeNB to the target DeNB, so as to complete the handover from the source DeNB to the target DeNB. After the handover is completed, the target DeNB informs the source DeNB to delete the context information of the mobile relay at the source DeNB.

Figure 7:
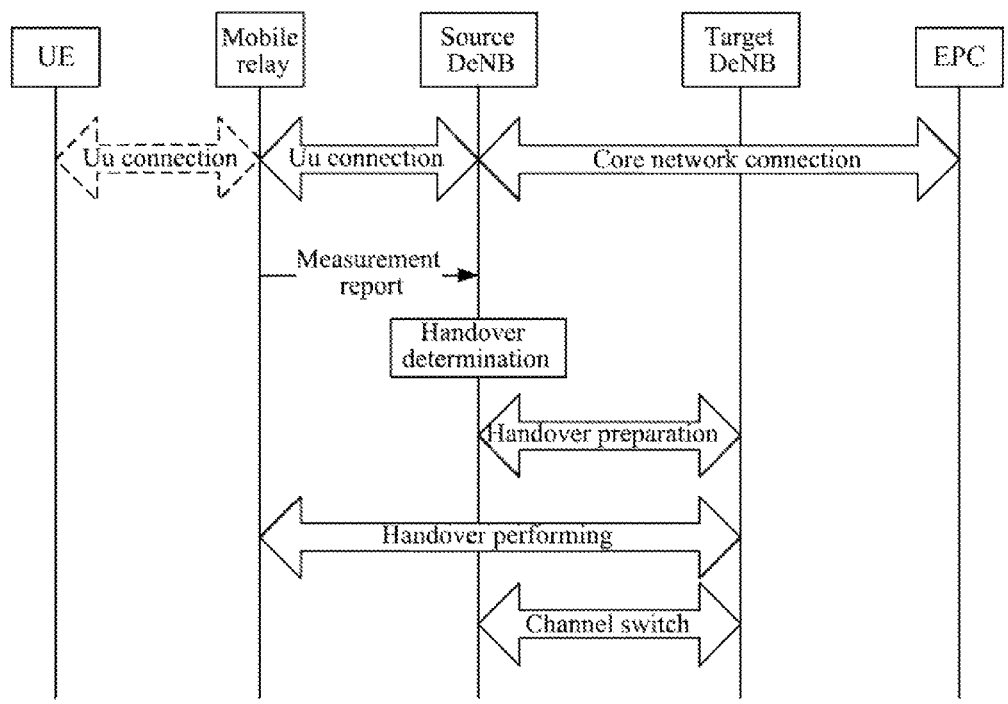
FIG. 7 is a flowchart of handover of a mobile relay according to the second embodiment of the present invention.

In accordance with the second embodiment of the present invention as shown in FIG. 7, in some actual scenes, configuration of a reverse transmission channel may be also required to be negotiated between the source DeNB and the target DeNB so as to reversely transmit data between the EPC and the mobile relay when the handover is performed, and reversely transmit the data which cannot be transmitted due to service interruption of the Un interface to the target DeNB. In some scenes, the source DeNB only needs to reversely transmit the data, which is transmitted from the EPC to the mobile relay, to the target DeNB, i.e., only establishes a downlink reverse transmission channel. After the handover preparation is completed, the source DeNB sets new Un configuration information of the mobile relay at the target cell, and transmits the Un configuration information to the mobile relay through the source DeNB. After receiving the new Un configuration information, the mobile relay performs Un reconfiguration to reconfigure the Un interface from the source DeNB to the target DeNB. Then, channel switch is performed, and configuration of the transmission channel is negotiated between the target DeNB and the source DeNB, so as to establish a data transmission channel between the mobile relay and the EPC after the handover is completed.

The difference between the handover procedure shown in FIG. 7 and that in FIG. 6 is that in FIG. 6, the reverse transmission is not required to be prepared during the handover preparation, and therefore, the transmission channel between the target DeNB and the source DeNB can be directly established, and the last channel switch operation is not required to be performed.

Figure 8:
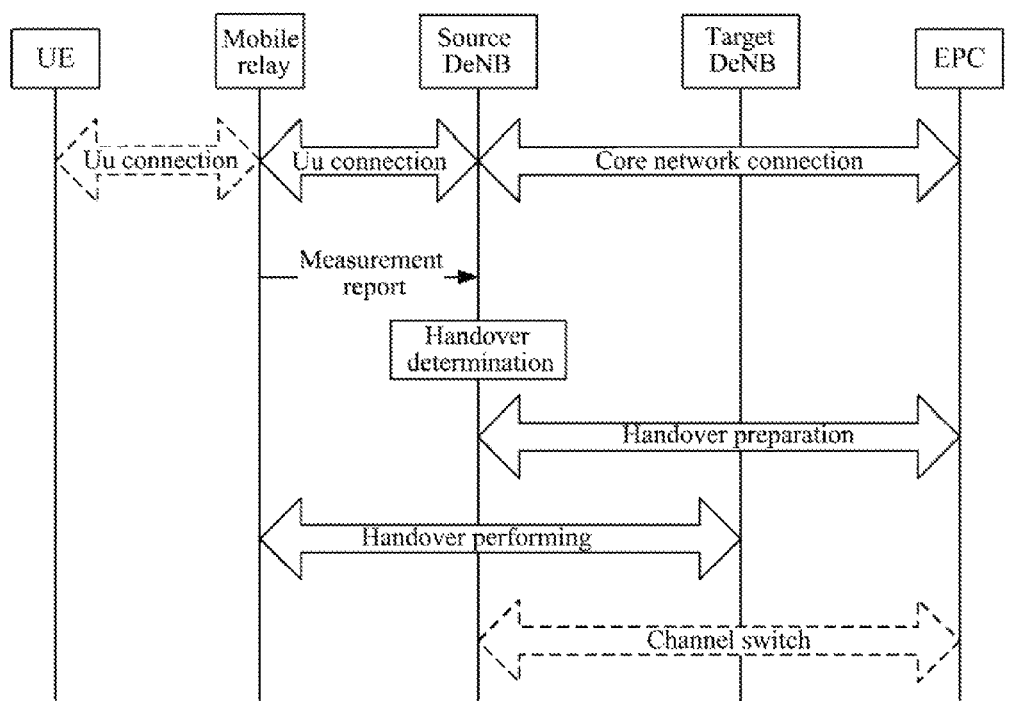
FIG. 8 is a flowchart of handover of a mobile relay according to the third embodiment of the present invention.

In addition, in the case that there is no direct connection between the source DeNB and the target DeNB in practical applications, operations, such as signaling interaction and transmission channel switch, etc., are required to be completed between the source DeNB and the target DeNB through the EPC. In the handover procedure of the third embodiment of the present invention as shown in FIG. 8, when the handover preparation is performed between the source DeNB and the target DeNB, some network elements of the EPC will be involved, for example, a MME serving the mobile relay assists in completing the signaling interaction between the source DeNB and the target DeNB; and when the channel switch is performed between the source DeNB and the target DeNB, the operation of the channel switch is decided by the EPC.

Figure 9:
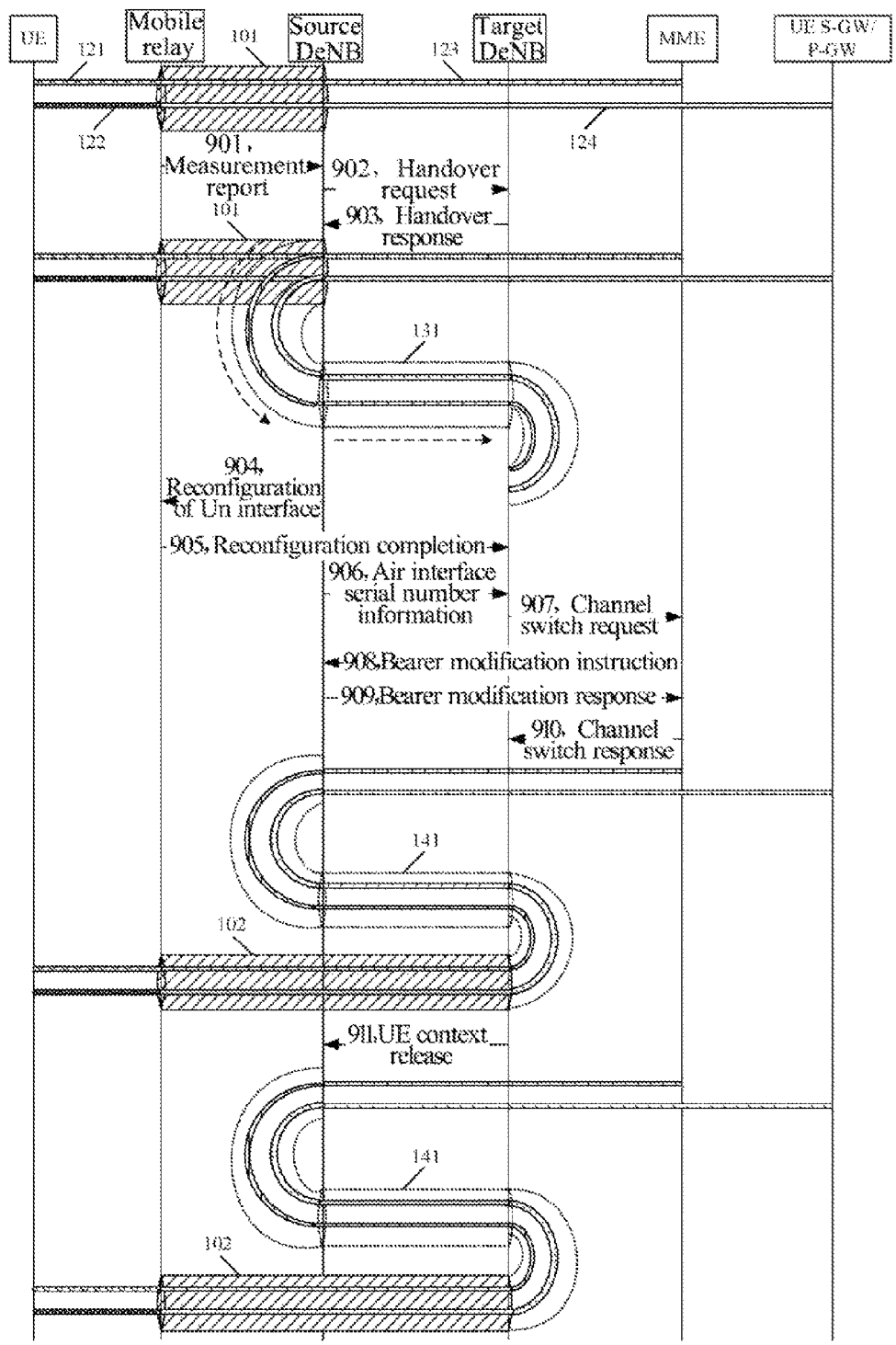
FIG. 9 is a flowchart of handover of a mobile relay according to the fourth embodiment of the present invention.

The handover procedure shown in FIG. 8 will be further described in detail hereinafter. In the fourth embodiment of the present invention as shown in FIG. 9, 121 and 123 represent control plane channels of the UE, which are used to transmit UE related control plane signaling; and 122 and 124 represent user plane channels of the UE, which are used to transmit UE related user plane data. 121 and 122 are transmitted by a Radio Bearer of an Uu interface between the UE and the mobile relay, wherein 121 is transmitted by a signal Radio Bearer, and 122 is transmitted by a Data Radio Bearer. 123 and 124 are transmitted respectively by a control plane channel and a user plane channel between the eNB which the UE corresponds to and serves the UE and the EPC. In the scene of deployment of the mobile relay, the eNB serving the UE is a mobile relay, the transmission channel between the mobile relay and the EPC is transmitted by the Radio Bearer 101 on the Un interface. 123 is a S1-Application Part (S1-AP) connection of the S1-MME in the LTE system, and 124 is a tunnel connection of a General Packet Radio Service (GPRS) Tunnelling Protocol for the User plane (GTP-U) of the user plane of the S1-U. The specific handover procedure comprises the following steps.

Step 901: the mobile relay transmits a measurement report to the source DeNB.

Step 902: the source DeNB triggers a handover process, and transmits a handover request to the target DeNB.

When the source DeNB discovers that signals of a resident cell under the source DeNB in which the mobile relay is located is worse than those of a cell under the target DeNB according to the measurement report, the source DeNB decides to initiate handover, and transmits the handover request to the target DeNB. The request at least carries a target cell identity of the mobile relay and context information of the mobile relay at the source DeNB, and may also carry UE related context information under the mobile relay, Aggregate Maximum Bit Rate (AMBR) of the mobile relay as a single network element, and configuration information of a reverse transmission channel. It is the GTP-U tunnelling protocol that is used in the LTE system, and the related configuration parameters include an IP address of the source DeNB and Tunnel End ID (TEID) of the GTP-U.

Step 903: the target DeNB receives and admits the handover request, stores corresponding context information and configuration information, and returns a handover response to the source DeNB.

The handover response at least carries Un configuration information of the mobile relay at the target cell, such as reconfiguration information, and may also carry opposite end configuration information of the reverse transmission channel. After the source DeNB receives the handover response, the establishment of the reverse transmission channel 131 is completed.

It is user plane data related to the whole mobile relay or user plane data related to a certain Evolution Radio Access Bearer (E-RAB) under the mobile relay that is transmitted in the reverse transmission channel, and at this point, the source DeNB regards the mobile relay as a UE, and establishes a reverse transmission channel for each relay E-RAB (which may also be regarded as an EPS bearer). The UE related user plane 123 and the user plane 124, upon transmission on the Un interface, are regarded as user plane data of the mobile relay or a certain E-RAB under the mobile relay, and therefore, the data of the UE is not required to be distinguished by the reverse transmission channel, and has been processed by the DeNB during the handover process. However, during the handover process, both the data which is not successfully transmitted by the radio bearer 101 of the Un interface and data (including data of 123 and 124) which is later transmitted by the EPC to the mobile relay are forwarded to the target DeNB through 131. The target DeNB will temporarily cache the data, and transmit the data to the mobile relay after the mobile relay is connected to the target DeNB. The beginning of the specific reverse transmission and the data for reverse transmission depend on the implementation.

Steps 904-905: the source DeNB transmits the Un reconfiguration information in the handover response to the mobile relay, and the mobile relay reconfigures the Un interface based on the reconfiguration information; and after the reconfiguration is completed, the Un interface is connected to the target DeNB, and the mobile relay transmits a reconfiguration completion message to the target DeNB to indicate that the handover is completed.

Step 906: in the reverse transmission process, the target DeNB may receive air interface serial number information transmitted by the source DeNB to indicate information of data packets received by the target DeNB in the handover process; the data packets are represented by serial numbers, and are used to indicate data of the mobile relay which is not successfully received by the target DeNB during uplink retransmission after the handover of the mobile relay is completed.

After the above operation has been performed, the handover operation is completed, and then the target DeNB can initiate a channel switch procedure.

Step 907: the target DeNB transmits a channel switch request to the MME of the EPC. In the present embodiment, assume that the MME serving the mobile relay and the MME of the UE are the same, but actually, they may also be different.

The request carries configuration information that a new transmission channel is required to be handed off to, and if the transmission channel still uses the GTP-U tunnel, the request carries a destination address and TEID of the transmission channel. The transmission channel may also be established for each E-RAB of the mobile relay (or may be regarded as an EPS bearer), and therefore, there are may be multiple transmission channels.

Steps 908-910: after receiving the channel switch request, the MME transmits bearer modification signaling to the source DeNB to inform the source DeNB to modify the configuration information of the transmission channel, which is an address of a downlink transmission channel end here; and the source DeNB returns a bearer modify response, which carries an address of an uplink transmission channel end, the address is returned to the target DeNB through a channel switch response of the MME.

In the process, a new transmission channel 141 is established. 141 corresponds to 102 through the E-RAB ID (or EPS bearer ID) of the mobile relay, and the corresponding relationship is carried by a handover instruction in the handover process. At the source DeNB side, according to the configuration information in steps 908-910, the data transmitted by the EPC to the mobile relay is transmitted to the target DeNB through the transmission channel 141. In the uplink aspect, the data on 102 received by the target DeNB is transmitted on the corresponding transmission channel according to the corresponding relationship of the E-RAB ID (or EPS bearer ID).

Step 911: the target DeNB transmits a release instruction to the source DeNB, and the source DeNB releases context information of the UE and the transmission channel 131.

Figure 10A:
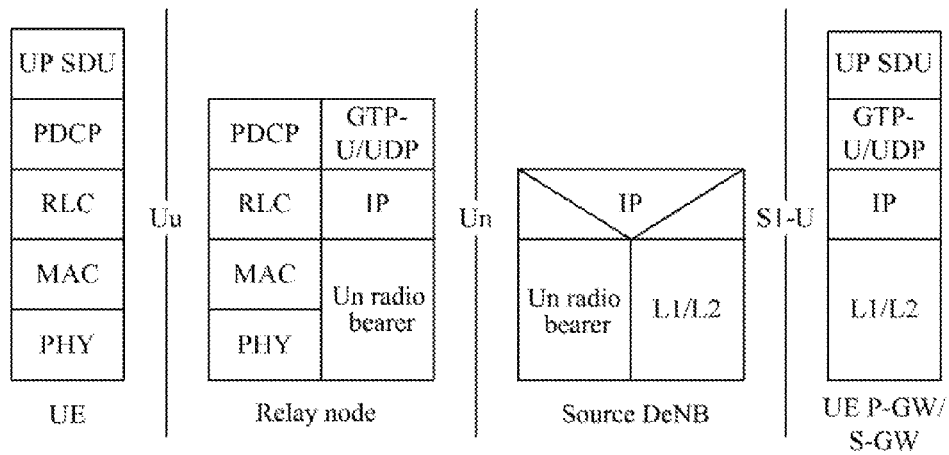
FIG. 10a is the first schematic diagram of a user plane protocol stack before the handover in the fourth embodiment of the present invention.
Figure 10B:
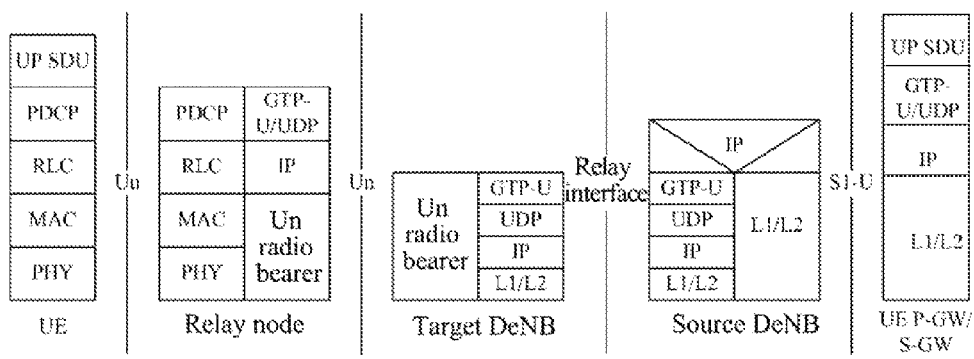
FIG. 10b is the first schematic diagram of a user plane protocol stack after the handover in the fourth embodiment of the present invention.

Corresponding to the handover procedure shown in FIG. 9, a typical user plane protocol stacks before and after the handover is shown in FIGS. 10a and 10b respectively. It can be seen that data between the mobile relay and the UE S-GW/P-GW is transmitted between the source DeNB and the target DeNB through a dedicated transmission channel, which is the GTP-U tunnel in the figures. After the handover, the source DeNB becomes a S-GW/P-GW of the mobile relay, and filters IP packets according to data packets transmitted by the EPC and defined tunnel blinding rules, and transmits the IP packets in each GTP-U tunnel separately based on Quality of Service (QoS) of different IP streams, such as QoS Class Identity (QCI) parameters.

The control plane protocol stack is similar to the user plane protocol stack, except that IP/UDP/GTP-U transmitted by the Un radio bearer is replaced by IP/SCTP/S1-AP.

Figure 11:
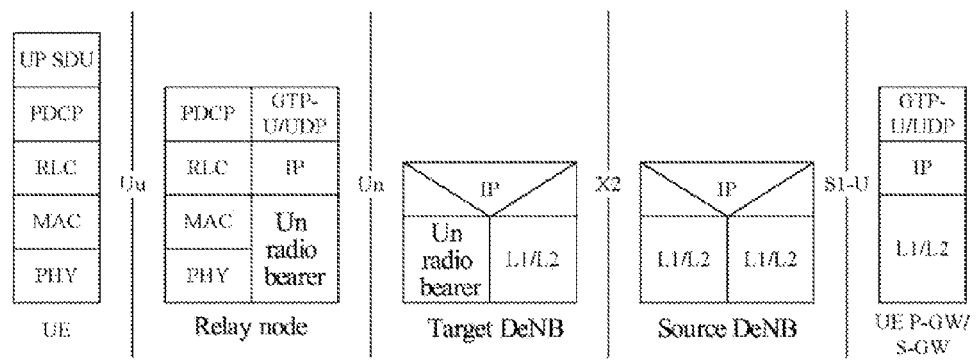
FIG. 11 is the second schematic diagram of a user plane protocol stack after the handover in the fourth embodiment of the present invention.

As shown in FIG. 11, another typical user plane protocol stack is provided. The source DeNB transmits data transmitted by the EPC to the mobile relay by means of IP routing, and forwards the data to the target DeNB. Conversely, the data transmitted by the target DeNB to the EPC is forwarded by the source DeNB. The forwarding relationship of the IP routing is negotiated between the source DeNB and the target DeNB, and can also be negotiated in the handover process.

Figure 12A:
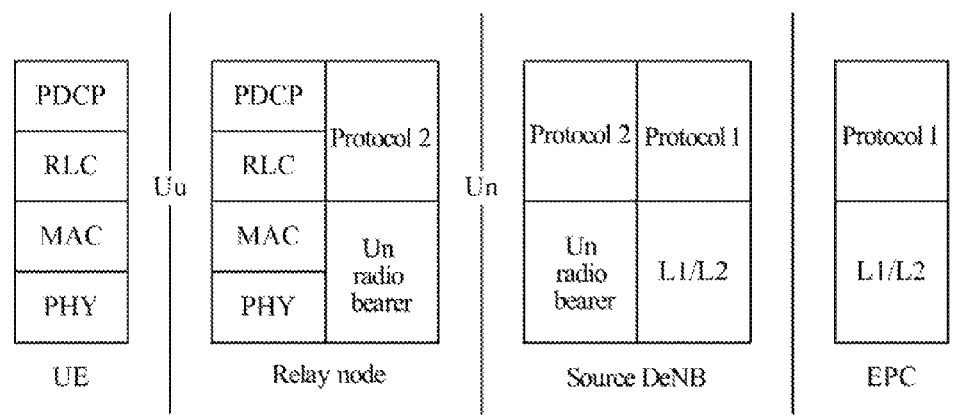
FIG. 12a is the second schematic diagram of a user plane protocol stack before the handover in the fourth embodiment of the present invention.
Figure 12B:
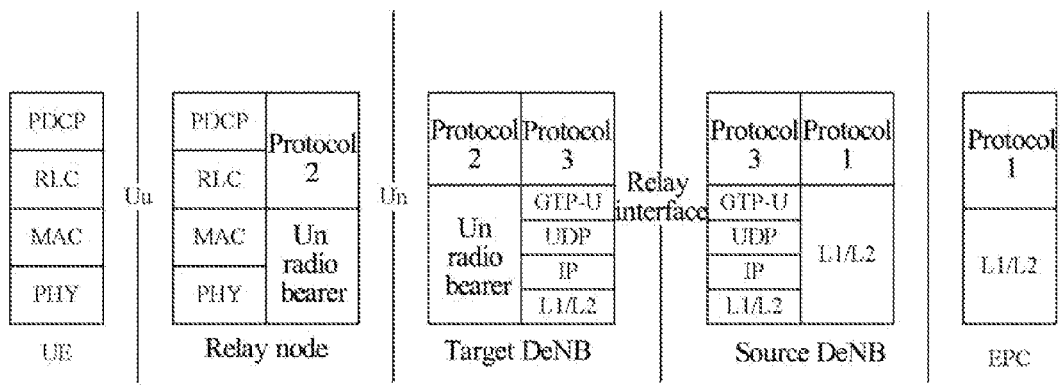
FIG. 12b is the third schematic diagram of a user plane protocol stack after the handover in the fourth embodiment of the present invention.
Figure 12C:
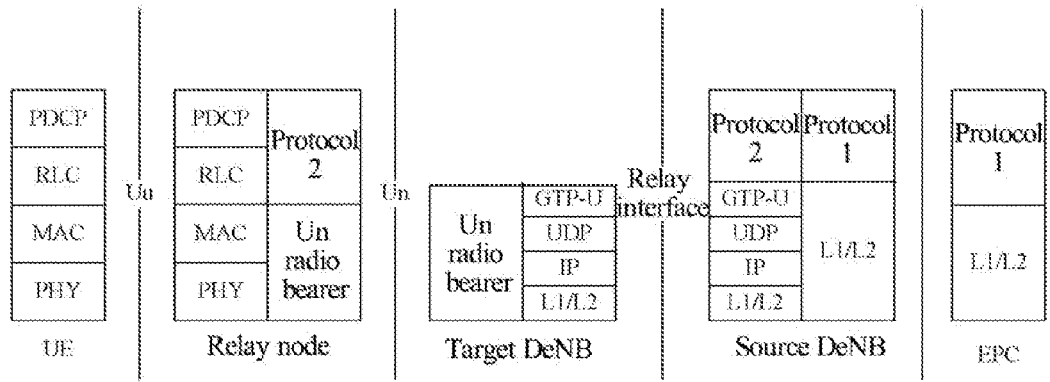
FIG. 12c is the fourth schematic diagram of a user plane protocol stack after the handover in the fourth embodiment of the present invention.

As shown in FIGS. 12a, 12b and 12c, a further typical user plane protocol stack before and after the handover is provided. Compared with FIGS. 10a and 10b, before the handover, the source DeNB not only performs IP forwarding and diffluence operations, but also performs translation operation on protocols, i.e., translation from Protocol 1 to Protocol 2 (the protocol in the present invention means a protocol entity, such as a GTP-U tunnel, TCP/SCTP connection, not a protocol type). Such architecture is referred to as gateway architecture. Protocol 1 and protocol 2 may be homogeneous, or heterogeneous. A typical homogeneous protocol may be a 2-segment tunnel protocol, i.e., protocol 1 is IP/UDP/GTP-U, and protocol 2 is also IP/UDP/GTP-U. For a typical heterogeneous protocol, for example, protocol 1 is IP/UDP/GTP-U, and protocol 2 is GTP-U or other channel protocols. After the handover, protocol 1 and protocol 2 are connected by a transmission channel, during which a process of firstly translating into protocol 3 and then translating back to protocol 1 or protocol 2 may be included. As shown in FIG. 12b, at this point, both the source DeNB and the target DeNB are a gateway. Also as shown in FIG. 12c, after the handover, the source DeNB also performs the translation process between protocol 1 and protocol 2, and transmits protocol 2 between the source DeNB and the target DeNB through the channel transmission the DeNBs.

In addition to context information of the Un interface of the mobile relay, configuration information of protocol 2 is also required to be transmitted between the source DeNB and the target DeNB such that the target DeNB can reestablish protocol 2. The establishment of protocol 3 is also required to be negotiated; context information of this gateway may be used as the context of the mobile relay in the handover preparation process, which is firstly transmitted to the target DeNB by the source DeNB. and then the target DeNB establishes a corresponding gateway structure. The configuration also belongs to configurations which can be negotiated between the target DeNB and the source DeNB. When the configuration is required to be changed, i.e., after the target DeNB can modify the configuration of the gateway, a handover response is returned to the source DeNB. A similar process can also be completed in the channel switch process, and at this point, the configuration is used as configuration of the DeNB.

The translation relationship between protocol 2 and protocol 3 and the translation relationship between protocol 1 and protocol 3 are negotiated, so as to ensure that the translation relationship between protocol 1 and protocol 2 remains unchanged. A typical implementation is that if protocols 1, 2 and 3 are all tunnelling protocols, then the translation relationship between protocols 1 and 2 is TEID1→TEID2, and the new protocol 3 is required to ensure that the translation relationship is TEID1→TEID3 and TEID3→TEID2. Such a translation relationship may be a particular rule, for example, the same TEID is maintained for a mapping between different protocols, or the translation relationship is in a form of a simple mapping table. The relationship can be negotiated between the source DeNB and the target DeNB.

Figure 13:
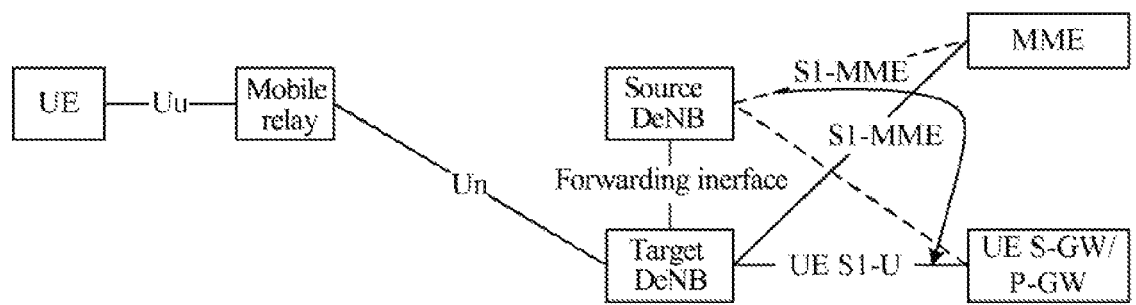
FIG. 13 is the second schematic diagram of handover of a mobile relay according to the present invention.
Figure 14:
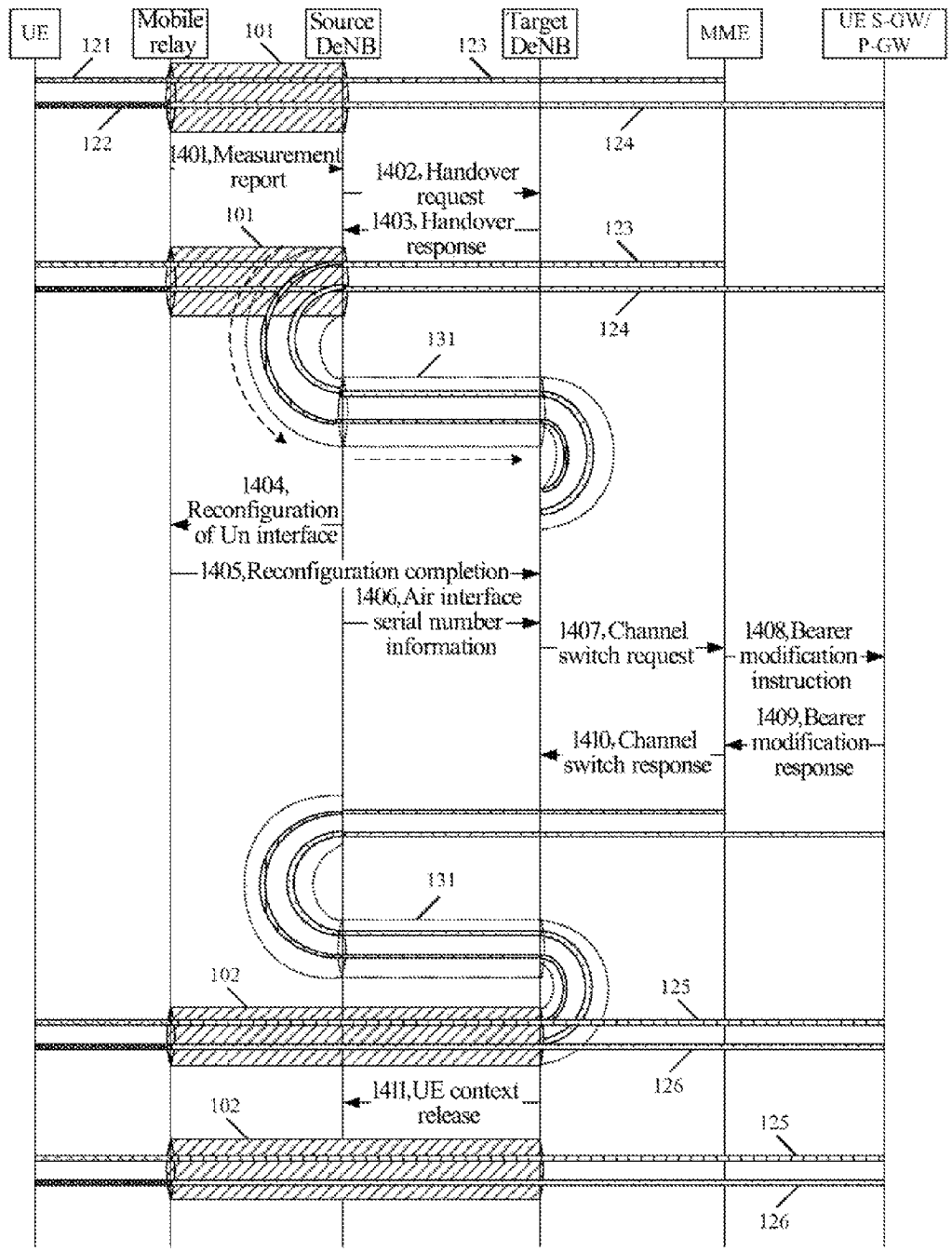
FIG. 14 is a flowchart of handover of a mobile relay according to the fifth embodiment of the present invention.

The present invention provides another handover method based on a mobile relay. As handover of the mobile relay occurs, an EPC transforms data of a UE which is served by the mobile relay from being forwarded through a source DeNB to being forwarded through a target DeNB based on control the target DeNB. The operation when channel switch is performed is shown in FIG. 13. The target DeNB informs the EPC (for example, S-GW/P-GW) to transmit the related data to the target DeNB. The specific handover procedure in accordance with the fifth embodiment is shown in FIG. 14. Compared with the procedure shown in FIG. 9, the difference is that in the channel switch process of steps 1407-1410, handover of user plane and control plane transmission channels of the UE is performed. Through the channel switch process, parameters for establishing control plane channel 125 and user plane channel 126 are negotiated between the EPC and the target DeNB. The parameters corresponding to 125 may be S1-AP ID, and the parameters corresponding to 126 may be TEID and IP address of the GTP-U. Therefore, in step 1407, the transmitted handover request is transmitted to the core network part to which the UE is connected under the mobile relay, which is MME in the figure. The signaling will carry S1-AP ID identifying connection 123 in the MME to indicate that configuration information of the UE to which the S1-AP ID corresponds is required to be modified, and the identity of connection 125 at the target DeNB, while carrying port identity of user plane channel 126 at the target DeNB, i.e., transmission IP address and GTP-U TEID.

After receiving the handover request, the MME establishes identity of 125 in the MME based on the S1-AP ID identity of 123, and transmits on 125 the signaling transmitted on 123. In step 1408, a bearer modification instruction is transmitted to the UE S-GW/P-GW, and corresponding configuration information of 124 is found based on the S1-AP ID identity of 123, to modify flow direction of data transmitted to 124 to be 126.

Subsequently, the UE S-GW/P-GW informs the MME of the uplink transmission channel end address of 126, i.e., transmission address and TEID, through a bearer modification response. The transmission address and the TEID are returned to the target DeNB in the channel switch response by the MME. The response may also carry an identification number of 125 in the MME. When receiving the channel switch response, the target DeNB can transmit the data of the original control plane connection 123 to which the UE corresponds to the MME of the UE on 125; and transmit the data on user plane 124 to the UE S-GW/P-GW on 126.

The above channel switch process can be initiated for each UE under the mobile relay, and can also be combined into a process to uniformly perform channel switch on all UEs under the whole mobile relay. In the above handover process, the target DeNB can carry identity of the handover of the mobile relay in the channel switch request to inform the EPC that such handover only serve the handover of the mobile relay. The UE is not moved in the cell under the mobile relay, to avoid some unnecessary reconfigurations, for example, there may be a security procedure, or a process of changing algorithms or keys in the original cell handover.

Figure 15A:
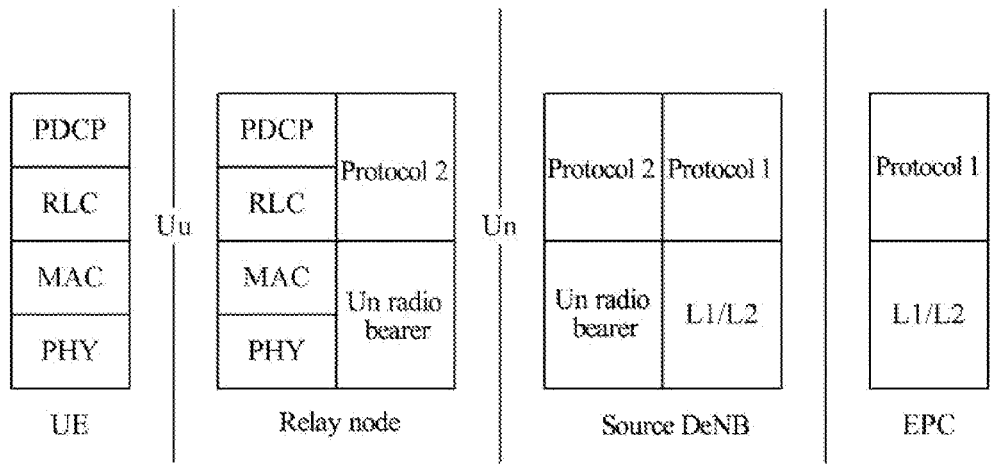
FIG. 15a is the first schematic diagram of a user plane protocol stack before the handover in the fifth embodiment of the present invention.
Figure 15B:
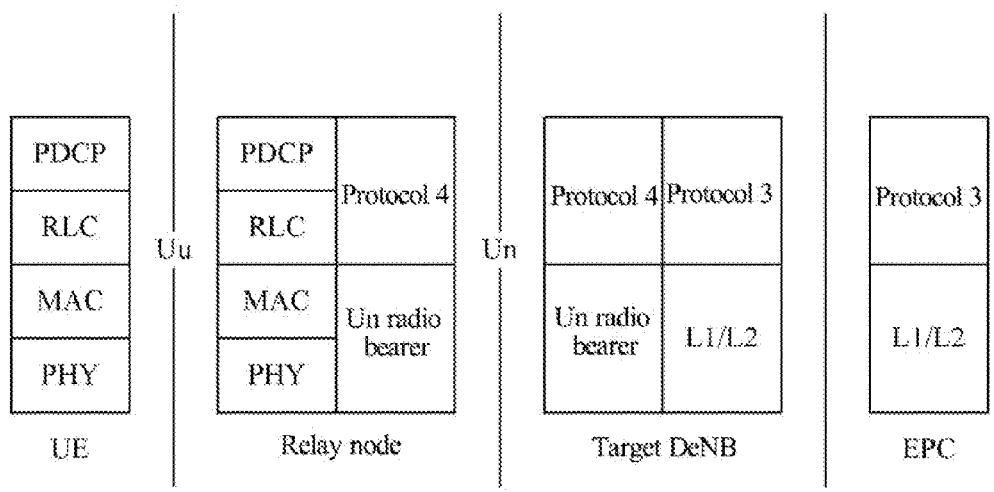
FIG. 15b is the first schematic diagram of a user plane protocol stack after the handover in the fifth embodiment of the present invention.

Corresponding to the handover procedure shown in FIG. 14, a typical user plane protocol stack before and after the handover in accordance with the present invention is shown in FIGS. 15a and 15b respectively. Protocol entities before the handover are protocol 1 and protocol 2, and protocol entities after the handover are protocol 3 and protocol 4.

Figure 16A:
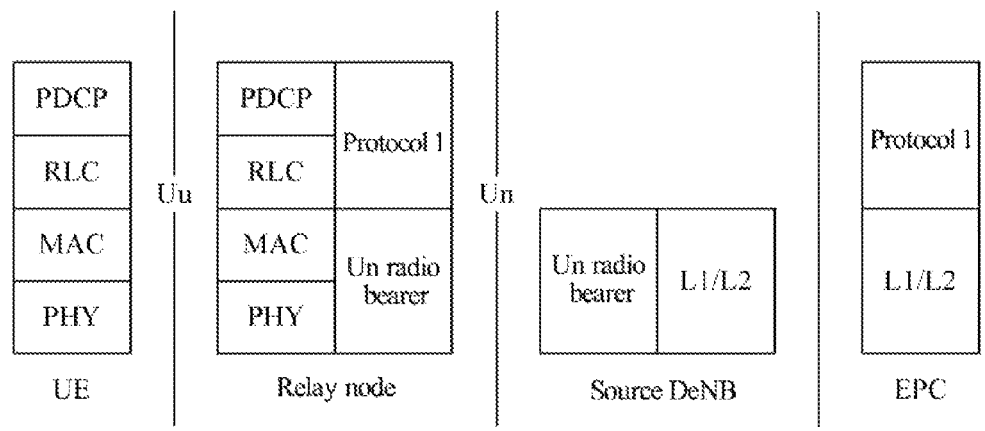
FIG. 16a is the second schematic diagram of a user plane protocol stack before the handover in the fifth embodiment of the present invention.
Figure 16B:
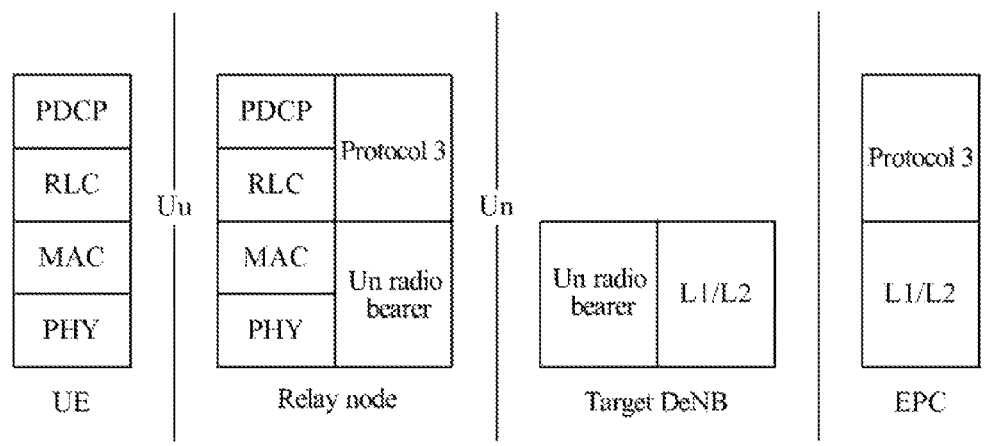
FIG. 16b is the second schematic diagram of a user plane protocol stack after the handover in the fifth embodiment of the present invention.

A user plane protocol stack before and after the handover as illustrated in FIGS. 16a and 16b represents a special case, i.e., protocol 1 in FIG. 15a is equivalent to protocol 2, and thus the DeNB therein is not required to perform the translation operation on the protocols. Before and after the handover, the protocol between the DeNB and EPC (which may be a MME or UE S-GW/P-GW) is transformed from protocol 1 to protocol 3 through the procedure in FIG. 14; and before and after the handover of the mobile relay, the protocol stack on the Un interface is transformed from protocol 2 to protocol 4. In normal case, protocol 2 may also be unchanged, i.e., protocol 2 is equivalent to protocol 4. Therefore, in order to complete the handover process, during the handover preparation and handover perform operations, the target DeNB will inform the mobile relay of the negotiated protocol 4. When the handover of the mobile relay is performed, not only the Un radio bearer part is required to be reconfigured to the target DeNB, but also protocol 2 is required to be reconfigured to protocol 4.

The above description is only the preferred embodiments of the present invention and is not intended to limit the protection scope of the present invention.

What I claim is:

1. A handover method based on a mobile relay, comprising:
   a source Donor evolved NodeB (DeNB) determining based on a measurement report sent by a mobile relay station or according to an internal determination factor that a handover of the mobile relay need to be executed, said source DeNB notifying a target DeNB;
   wherein, said source DeNB is the eNB that connected with the mobile relay station before the handover, said target DeNB is the eNB that connected with the mobile relay station after the handover, a relay access network at least include the target DeNB and the mobile relay station; a said source DeNB, working as an intermediate node to connect the relay access network with an Evolved Packet Core (EPC); and the source DeNB forwarding data from the relay access network to the EPC and forwarding the data from the EPC to the relay access network, wherein the mobile relay is a relay that has certain mobility;
   the mobile relay fulfill the handover in the following steps:
   perform handover preparation between the source DeNB and the target DeNB by exchanging context information of the mobile relay of the source DeNB;
   after the handover preparation is completed, the target DeNB sets new Un configuration information of the mobile relay at a target cell, and transmits the new Un configuration information to the mobile relay through the source DeNB; and the mobile relay performs Un reconfiguration based on the received Un configuration information, and reconfigures an Un interface from the source DeNB to the target DeNB.

2. The method according to claim 1, wherein a forward channel between the source DeNB and the target DeNB encapsulates the data.

3. The method according to claim 2, wherein the forward channel is an Evolved Radio Access Bearer (E-RAB) backhaul transmission channel of the mobile relay.

4. The method according to claim 1, further comprising:
   after the mobile relay reconfigures the Un interface from the source DeNB to the target DeNB, negotiating configuration of a transmission channel between the target DeNB and the source DeNB and/or the EPC, performing channel switch, and establishing a data transmission channel between the mobile relay and the EPC.

5. The method according to claim 1, further comprising:
   after the mobile relay is handed over to the target DeNB, the EPC switched to transform the data of an UE that served by the mobile relay through the target DeNB from through the source DeNB.

6. The method according to claim 5, wherein the EPC at least includes a Mobility Management Entity (MME), which serves the UE, and a Serving Gateway (S-GW) or Packet Data Network Gateway (P-GW).

7. The method according to claim 5, wherein the data of the UE includes S1 control plane signaling and S1 user plane data of the UE.

8. The method according to claim 6, wherein the data of the UE includes S1 control plane signaling and S1 user plane data of the UE.

9. A mobile wireless relay system comprising a relay access network and an Evolved Packet Core (EPC), wherein the relay access network at least comprises a target Donor evolved NodeB (DeNB) and a mobile relay, a source DeNB, as an intermediate node, connects the relay access network with the EPC;
   a source Donor evolved NodeB (DeNB) determining based on a measurement report sent by a mobile relay station or according to an internal determination factor that a handover of the mobile relay need to be executed, said source DeNB notifying the target DeNB; wherein, said source DeNB is the eNB that connected with the mobile relay station before the handover, said target DeNB is the eNB that connected with the mobile relay station after the handover, a relay access network at least include the target DeNB and the mobile relay station; said source DeNB working as an intermediate node to connect the relay access network with an Evolved Packet Core (EPC); and the source DeNB forwarding data from the relay access network to the EPC and forwarding the data from the EPC to the relay access network, wherein the mobile relay is a relay that has certain mobility;
   the target DeNB is further configured to perform handover preparation with the source DeNB, and exchange context information of the mobile relay at the source DeNB; and after the handover preparation is completed, set new Un configuration information of the mobile relay at a target cell, and transmit the Un configuration information to the mobile relay through the source DeNB; and accordingly, the mobile relay is further configured to perform Un reconfiguration based on the received Un configuration information, and reconfigure an Un interface from the source DeNB to the target DeNB.

10. The mobile wireless relay system according to claim 9, wherein a forward channel between the source DeNB and the target DeNB encapsulates the data, and the forward channel is an Evolved Radio Access Bearer (E-RAB) back-haul transmission channel of the mobile relay.

11. The mobile wireless relay system according to claim 9, wherein the target DeNB is further configured to, after the mobile relay reconfigures the Un interface from the source DeNB to the target DeNB, negotiate configuration of a transmission channel between the source DeNB and/or the EPC, perform channel switch, and establish a data transmission channel between the mobile relay and the EPC.

\* \* \* \* \*